(12) United States Patent
Kraft et al.

(10) Patent No.: US 11,976,588 B2
(45) Date of Patent: May 7, 2024

(54) GAS TURBINE HOT AIR INJECTION POWER AUGMENTATION UTILIZING COMPRESSED STORED AIR

(71) Applicant: POWERPHASE LLC, Jupiter, FL (US)

(72) Inventors: Robert J. Kraft, Tequesta, FL (US); Plazi Ricklin, Jupiter, FL (US)

(73) Assignee: Powerphase International, LLC, Hobe Sound, FL (US)

( * ) Notice: Subject to any disclaimer, the term of this patent is extended or adjusted under 35 U.S.C. 154(b) by 0 days.

(21) Appl. No.: 16/259,123

(22) Filed: Jan. 28, 2019

(65) Prior Publication Data

US 2019/0234303 A1 Aug. 1, 2019

Related U.S. Application Data

(60) Provisional application No. 62/622,510, filed on Jan. 26, 2018.

(51) Int. Cl.
| | |
|---|---|
| *F02C 3/30* | (2006.01) |
| *F02C 1/00* | (2006.01) |
| *F02C 6/16* | (2006.01) |
| *F02C 7/08* | (2006.01) |

(52) U.S. Cl.
CPC ............. *F02C 3/305* (2013.01); *F02C 6/16* (2013.01); *F02C 1/00* (2013.01); *F02C 7/08* (2013.01); *F05D 2260/42* (2013.01); *F05D 2260/85* (2013.01)

(58) Field of Classification Search
CPC .... F02C 3/305; F02C 6/16; F02C 1/00; F02C 7/08; F05D 2260/42; F05D 2260/85
See application file for complete search history.

(56) References Cited

U.S. PATENT DOCUMENTS

| | | | | |
|---|---|---|---|---|
| 2013/0125525 | A1* | 5/2013 | Hein | F01K 13/02 60/39.182 |
| 2014/0250902 | A1* | 9/2014 | Kraft | F02C 7/10 60/773 |
| 2014/0366547 | A1* | 12/2014 | Kraft | F02C 7/10 60/772 |
| 2014/0373551 | A1* | 12/2014 | Kraft | F02C 7/08 60/772 |
| 2015/0184593 | A1* | 7/2015 | Kraft | F02C 6/18 60/782 |
| 2015/0233296 | A1* | 8/2015 | Kraft | F02C 9/50 60/776 |
| 2015/0240719 | A1* | 8/2015 | Kraft | F02C 1/04 290/52 |
| 2016/0090998 | A1* | 3/2016 | Kraft | F02C 6/16 60/327 |
| 2016/0130982 | A1* | 5/2016 | Kraft | F01K 23/101 60/775 |

(Continued)

*Primary Examiner* — Arun Goyal
*Assistant Examiner* — Henry Ng
(74) *Attorney, Agent, or Firm* — AVEK IP, LLC

(57) ABSTRACT

Gas turbine power plants augmented with an air injection system for hot air injection to augment power and are used to drive sensitive cogeneration processes are fitted with compressed air storage capability to more smoothly ramp on air injection in the event of sudden and unexpected interruption of the air injection system. Utilizing stored hot air injection prior to starting an air injection system significantly reduces the start-up time of the air injection system.

10 Claims, 3 Drawing Sheets

(56) References Cited

U.S. PATENT DOCUMENTS

| | | | |
|---|---|---|---|
| 2016/0131030 A1* | 5/2016 | Kraft | F02C 6/18 |
| | | | 60/775 |
| 2016/0131031 A1* | 5/2016 | Kraft | F02C 7/08 |
| | | | 60/773 |
| 2017/0016395 A1* | 1/2017 | Kim | F02C 1/02 |
| 2018/0030902 A1* | 2/2018 | Kraft | F02C 6/18 |
| 2018/0163626 A1* | 6/2018 | Kraft | F01K 21/047 |

* cited by examiner

GAS TURBINE HOT AIR INJECTION POWER AUGMENTATION UTILIZING COMPRESSED STORED AIR

CROSS REFERENCE TO RELATED APPLICATIONS

This application claims the benefit of U.S. Provisional Patent Application Ser. No. 62/622,510, filed Jan. 26, 2018, the entire disclosure of which is hereby incorporated herein by reference.

FIELD OF THE INVENTION

The invention relates generally to electrical power systems, including generating capacity of a gas turbine, and more specifically delivering additional power from a gas turbine with an auxiliary air injection system having compressed air storage to reduce the startup time and shutdown process of the auxiliary air injection system in case of an unexpected event during gas turbine operation.

BACKGROUND OF THE INVENTION

Gas turbine engines consume air and fuel and deliver power for an application, such as propulsion or electricity generation. The mass flow ratio of air to fuel is relatively constant for all gas turbine engines at a ratio of about 98% air to 2% fuel. Applicant has developed a patented air injection technology for use in gas turbine engines. While this air injection technology generates hot compressed air, similar in properties to the hot compressed air found at the exit of a gas turbine compressor, it does so in a more efficient process than the gas turbine. However, there is a need to improve the reliability, reduce the startup time, and improve operational issues in the event of system interruption with the air injection system.

In many regions, including areas with high density of renewable energy, there is significant value if the power source can be started quickly. By being able to start quickly, less spinning reserve (power on standby) is required on the grid, which leads to significant grid efficiencies. Gas turbine original equipment manufacturers (OEM's) are improving the startup times for gas turbine engines and can now start aero-type gas turbines in about ten minutes and large frame gas turbines in about twenty to thirty minutes. Traditional gas turbine startup times can be too slow to react to variations in solar and wind power generation. The auxiliary air injection system, such as that produced by the assignee, and depicted in FIG. 1, can react in about sixty seconds, which is approaching the startup time required to react to a sudden change in renewable energy.

Gas turbine engines are often used in cogeneration capacity where they produce power, but also produce steam that is used in an alternate process, such as a manufacturing plant. One such manufacturing process is urea generation. The urea generation process utilizes the steam and power generated by the gas turbine to produce urea. If there is more than 10% change in power or steam production in one minute, the urea production process is susceptible to problems and the system must be stopped and restarted. The restart is undesirable for several reasons including the maintenance penalty the gas turbine incurs when it is tripped.

SUMMARY OF THE INVENTION

The current invention provides a system and method of operating a gas turbine engine equipped with an air injection system for power augmentation system incorporating compressed air storage to reduce response time of the air injection system or to improve transition from the air injection system in the event the air injection system unexpectedly shuts down.

In an embodiment of the present invention, a method of reducing start time of an auxiliary air injection system of a gas turbine engine is disclosed. The method comprises operating a gas turbine engine, compressing air with an auxiliary air compressor to a pressure higher than that in the compressor discharge plenum of the gas turbine engine, and storing the compressed air from the auxiliary air compressor in a storage tank. The stored compressed air in the storage tank is heated to form hot compressed air and the hot compressed air is then injected into the gas turbine engine at a rate sufficient to increase the power output of a gas turbine power plant, for a period of time. The flow of the hot compressed air from the storage tank to the gas turbine is reduced while simultaneously increasing a flow of hot compressed air from the air injection system.

In another embodiment of the present invention, a method of providing continuous supplemental heated compressed air to a gas turbine engine is disclosed. In this method, a gas turbine engine is operated where the engine receives hot compressed air supplied from an air injection system, separate from the gas turbine engine. Air is then compressed by an auxiliary air compressor to a pressure higher than air in the compressor discharge plenum. The compressed air is then stored in a storage tank and the hot compressed air from the air injection system is reduced and a flow of compressed air from the storage tank is initiated. The compressed air from the storage tank is then heated with a thermal media to form a mass flow of hot compressed air. As the hot compressed air is injected into the gas turbine, the air injection from the air injection system is further reduced. The flow of compressed air from the air injection system is then terminated and then the flow of stored compressed air from the storage tank is compressed.

In yet another embodiment of the present invention, a supplemental air supply system for a gas turbine engine is provided. The system comprises a compressor, a compressor discharge plenum, a combustor, and a turbine fluidly connected to each other, an air injection system in selective communication with the compressor discharge plenum, and an auxiliary air compressor in fluid communication with a storage tank, where the storage tank is in selective communication with the gas turbine engine. The gas turbine engine is in communication with the air injection system and the storage tank such that a flow of compressed air can be supplied to the gas turbine engine from the air injection system or the storage tank such that the flow is regulated.

BRIEF DESCRIPTION OF THE SEVERAL VIEWS OF THE DRAWINGS

The present invention is described in detail below with reference to the attached drawing figures, wherein.

DETAILED DESCRIPTION OF THE INVENTION

Figure 1:
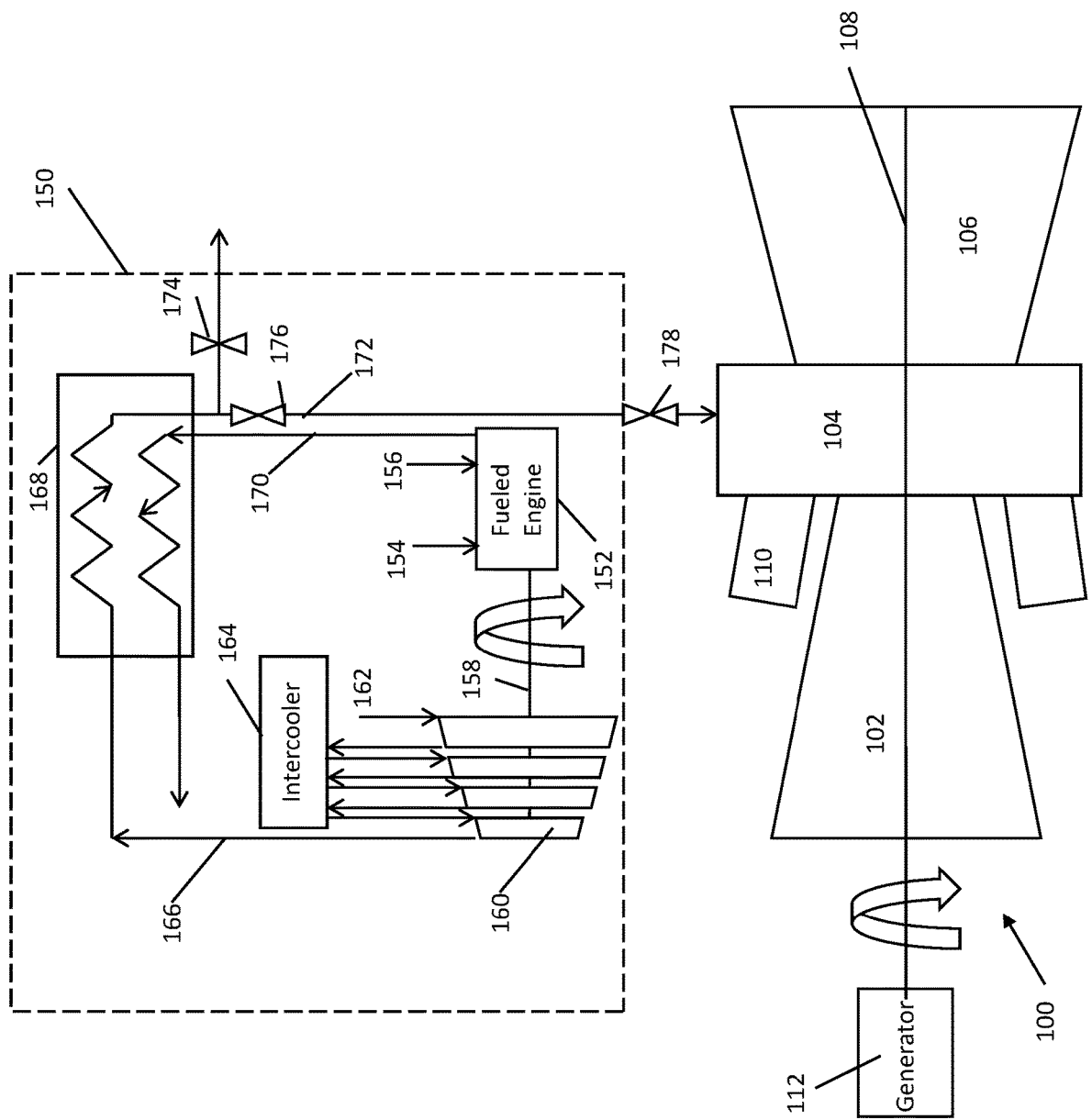
FIG. 1 is a schematic drawing of a gas turbine engine and an air injection system produced by the assignee of the present invention.

The air injection system of the present invention utilizes a high speed reciprocating engine, such as one operating at 1500 or 1800 revolutions per minute (RPM), for the power to drive the compression process. These types of engines are designed to start quickly, typically in 60 seconds or less.

The proposed invention includes a high pressure storage tank, which is filled with air compressed with a relatively small auxiliary compressor to store air at pressures approximately ten times the pressure of the air injection system. One such compressor is a multi-stage reciprocating compressor. The auxiliary compressor utilizes an auxiliary plant load, such as electrical or steam, to heat and maintain the temperature of the stored compressed air in the storage tank. When the air injection system is called to start, the high pressure air in the storage tank is released, at a flow rate similar to what the air injection system delivers within seconds of the start command, resulting in power augmentation to the gas turbine engine in seconds. Once the air injection system has developed full pressure and is capable of delivering heated air to the gas turbine engine, which typically takes 1 to 2 minutes, the heated air flowing from the storage tank is reduced as the flow of compressed air from the air injection system increases in flow. Effectively, this results in the air injection system being able to start in a matter of seconds versus 1 to 2 minutes.

Some processes are driven with a gas turbine in cogeneration (such as generating power and steam) and are sensitive to sudden changes in power and/or steam. One such process is urea generation. When the air injection system is installed and operational on a gas turbine, the air injection typically results in approximately 10-20% more power and 3-6% more steam production. If the air injection system turns off unexpectedly, this may cause the urea generation process to become unstable and force the operator to stop the generation process. In this case, instead of using plant auxiliary load to heat the stored air, a thermal tank filled with media and operated at temperature and pressure level of the air injection system (which is similar to the pressure of the gas turbine compressor discharge plenum) is heated with some of the air from the air injection system, thus eliminating the need for electrical or steam auxiliary heat. A small portion of the hot compressed air being delivered to the gas turbine is routed through the thermal media while the air injection system is in operation, and if for some reason the air injection system turns off, the stored high pressure air is first injected into the thermal media tank and heated, and then enters the line that is feeding the air injection process to the gas turbine. The high pressure storage tank and thermal media can be sized to provide the ramp down time desired depending on the process needs. One advantage of using a thermal media instead of storing heated high pressure air is the fact that the high pressure storage tank will be less critical and lower cost if it is cold versus hot. For example, the air injection system pressure is typically 20 to 30 psi higher than the gas turbine compressor discharge pressure, which ranges from 150 to 500 psi. The air storage tank may be at pressures in the 1000 to 5000 psi range. It is important to design the storage tank to withstand pressures at least five times the pressure found in the gas turbine compressor discharge in order to maintain as small of a tank size as possible as typically there are space constraints at the power plants. By using a thermal media heating tank, the operating pressure of this tank is similar to the pressures found in the gas turbine compressor discharge.

In an alternate embodiment of the present invention, air from the compressor discharge plenum of the gas turbine engine can be cycled through to the thermal media to provide a means of heating the thermal media.

Referring initially to FIG. 1, a representative gas turbine engine 100 is shown in conjunction with an air injection system 150 of the assignee of the present invention. The gas turbine engine 100 comprises a compressor 102, a compressor discharge plenum 104, and a turbine 106 that is coupled to the compressor 102 through a shaft 108. The gas turbine engine 100 also includes one or more combustors 110 that receive compressed air from the compressor discharge plenum 104 and mix fuel in the combustors 110 to produce hot combustion gases used to drive the turbine 106. Also coupled to the shaft 108 is a generator 112 which uses the mechanical energy of the shaft 108 to turn the generator 112 and produce electricity.

The dashed box in FIG. 1 represents the air injection system 150. The air injection system 150 comprises a fueled engine 152 that receives engine fuel 154 and non-compressed air 156. The fueled engine 152, such as a reciprocating engine, produces mechanical power turning a shaft 158 that is coupled to an auxiliary air compressor 160. The auxiliary air compressor 160 receives non-compressed air 162 and compresses the air to a higher pressure and slightly higher temperature. Temperature rise in the compressed air from the auxiliary compressor can be controlled through the use of an intercooler 164, where the compressed air is cooled in between each stage of the compressor 160. Compressed air 166 exits the intercooled compressor 160 and flows through a recuperator 168 where it is heated with waste heat 170 from the fueled engine 152. The compressed air 166 exits the recuperator 168 as heated compressed air 172. This heated compressed air 172 can be vented to the atmosphere through a vent valve 174 or passed to the gas turbine engine 100 for power augmentation through an injection control valve 176.

When the air injection system 150 is started, the gas turbine injection control valve 178 at the gas turbine engine 100 and the injection control valve 176 are closed and vent valve 174 is open. The fueled engine 152 in the air injection system 150 is brought to 75% load or higher and air flow is generated at a low pressure and it is vented to atmosphere. Once the air injection system 150 is stabilized the vent valve 174 is partially closed and pressure starts to build in the system. The vent valve 174 continues to close until the desired pressure is achieved, a pressure about the same as the pressure in the gas turbine compressor discharge plenum 104. Once this is achieved, the pressure in the air injection pipe just upstream of the air injection system injection control valve 176 is approximately equal to the pressure found in the gas turbine compressor discharge plenum 104. Then the gas turbine injection control valve 178 at the gas turbine engine 100 is opened and the pipe between the auxiliary injection system 150 and the gas turbine engine 100 fill with hot pressurized air. At this point the pressures are said to be equal as the pressure on both sides of valve 176 are the same. Then valve 176 is completely opened, and no air flow initiates, because the pressures are equalized. Then the vent valve 174 is closed completely, which forces the air to flow to the gas turbine engine 100. As the air flows to the gas turbine engine 100, a relatively small pressure drop develops as a result of the increasing flow. This start-up process for the air injection system 150 takes about 60 seconds.

Figure 2:
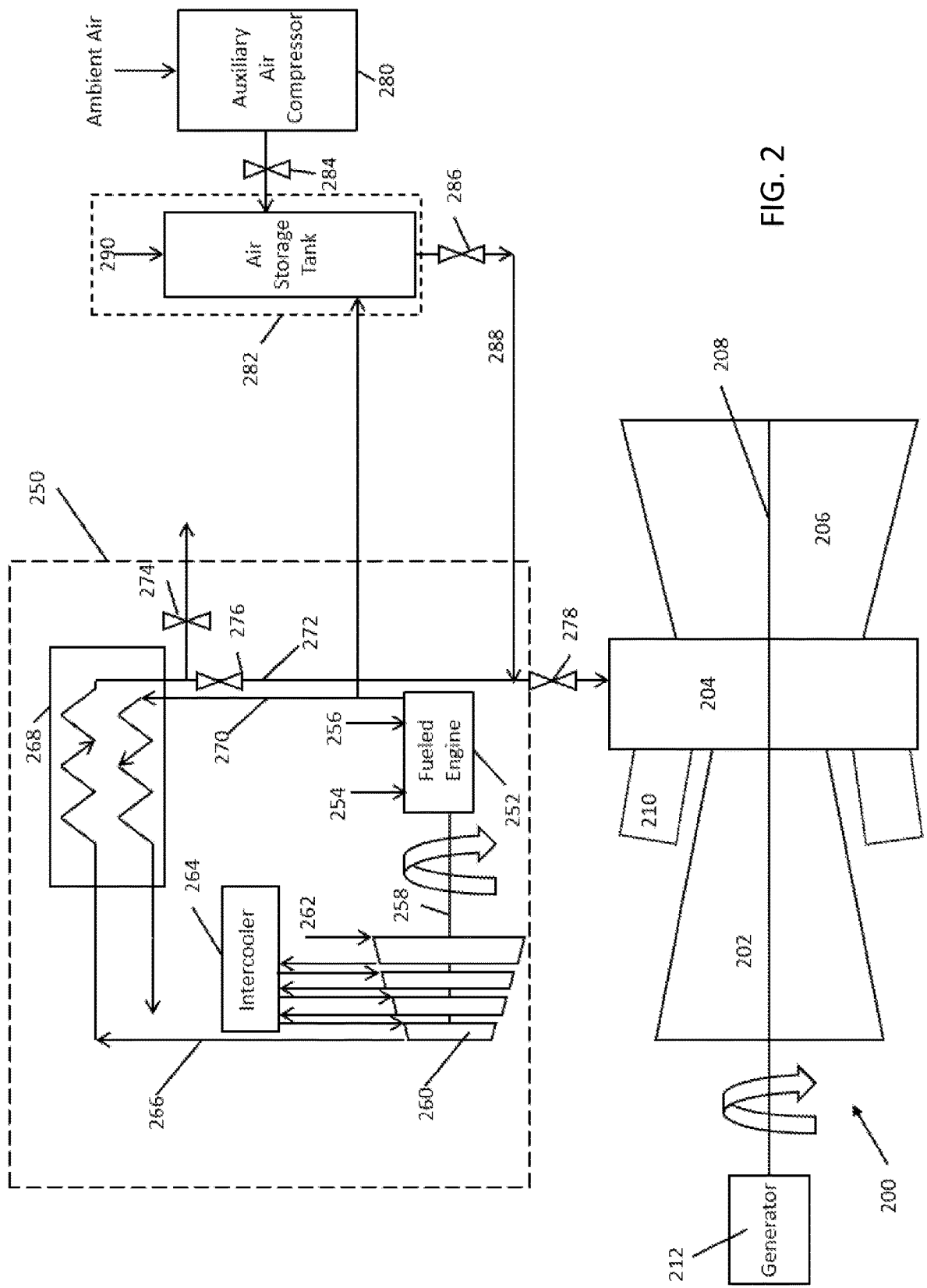
FIG. 2 is a schematic drawing of a gas turbine engine, air injection system, and air storage system in accordance with an embodiment of the present invention.

Referring now to FIG. 2, an embodiment of the present invention is depicted. The present invention is used in conjunction with a gas turbine engine 200. The gas turbine engine 200 comprises a compressor 202, a compressor discharge plenum 204, and a turbine 206 that is coupled to the compressor 202 through a shaft 208. The gas turbine engine 200 also includes one or more combustors 210 that receive compressed air from the compressor discharge plenum 204 and mix fuel in the combustor 210 to produce hot combustion gases used to drive the turbine 206. Also coupled to the shaft 208 is a generator 212 which uses the mechanical energy of the shaft 208 to turn the generator and produce electricity.

An air injection system 250, as discussed above, is also provided. The dashed box in FIG. 2 represents the air injection system 250, which comprises a fueled engine 252 that receives engine fuel 254 and non-compressed air 256. The fueled engine 252, such as a reciprocating engine, produces mechanical power turning a shaft 258 that is coupled to an auxiliary air compressor 260. The auxiliary air compressor 260 receives non-compressed air 262 and compresses the air to a higher pressure and slightly higher temperature. Temperature rise in the compressed air from the auxiliary compressor can be controlled through the use of an intercooler 264, where the compressed air is cooled in between each stage of the compressor 260. Compressed air 266 exits the intercooled compressor 260 and flows through a recuperator 268 where it is heated with waste heat 270 from the fueled engine 252. The compressed air 266 exits the recuperator 268 as heated compressed air 272. This heated compressed air 272 can be vented to the atmosphere through a vent valve 274 or passed to the gas turbine engine 100 for power augmentation through an injection control valve 276 and/or a gas turbine injection control valve 278.

The present invention also comprises an auxiliary air compressor 280 that is in selective fluid communication with an air storage tank 282. An auxiliary air compressor 280 can be electrically driven. The auxiliary air compressor 280 takes ambient air and compresses the air and stores it in the storage tank 282 at pressures much higher than the gas turbine compressor discharge pressure, which can be 1000 to 5000 psi. In an embodiment of the present invention, a pressure of the hot compressed air in the storage tank can be more than five times greater than pressure of compressed air in the compressor discharge plenum 204. This air is delivered to the storage tank 282 through a pipe and isolation valve 284. When the storage process is complete, the isolation valve 284 is closed and the air is stored at the desired pressure.

The air storage tank 282 is in selective communication with the gas turbine engine 200. Through this arrangement, the gas turbine engine 200 is in communication with the air injection system 250 and the air storage tank 282. The flow of air from the auxiliary air compressor 280 to the air storage tank 282 is regulated by the isolation valve 284 and the flow out of the air storage tank 282 through outlet line 288 is regulated by a storage outlet valve 286. The air storage tank 282 can be heated, either with an electrical heat source 290 or with heat from the air injection system 250, such as waste heat from the fueled engine 252. The electrical heat source 290 is either placed inside the air storage tank 282 in direct contact with the air in the tank or on the outside of the air storage tank 282 to serve as a thermal blanket. The electrical heat source 290 can be controlled by a thermostat (not shown) which is measuring the air temperature inside the air storage tank 282 directly or the metal temperature of the tank 282. In yet another embodiment of the present invention, the air storage tank 282, is heated with heat from the gas turbine engine 200 or from an alternate source, such as a steam source, including a steam-to-air heat exchanger located within the storage tank. This heating process can occur by taking heat out of the gas turbine engine 200, such as from the compressor discharge region.

To reduce the time required for system start-up, heated compressed air is stored in the air storage tank 282, and while the air injection system 250 is started, as described above, the heated air from the tank 282 is injected in the gas turbine 200. A typical air injection system delivers between 10 and 15 lb/sec of heated compressed air, and therefore the air storage tank 282 is sized to deliver similar flow rates for a long enough duration to comfortably start the air injection system 250.

In an alternate embodiment of the present invention, a method of reducing start time of an air injection system is disclosed. The method provides for operating a gas turbine engine 200 having a compressor 202, a compressor discharge plenum 204, a combustor 210, and a turbine 206. Air is compressed by an auxiliary air compressor 280 to a pressure higher than that of the compressor discharge plenum 204 of the gas turbine engine 200. The compressed air from the auxiliary air compressor 280 is stored in a storage tank 282. The storage tank 282 is heated to form heated compressed air, and the heated compressed air from the storage tank 282 is injected into the gas turbine 200 at a flow rate sufficient to increase the power output of a gas turbine power plant, for a period of time. The flow of heated compressed air from the storage tank 282 is then reduced while simultaneously increasing a flow of heated compressed air being generated by the air injection system 250. This process permits for much quicker power augmentation via the heated stored air as opposed to the air injection coming online. The flow of heated compressed air from the storage tank 282 is reduced and the compressed air from the air injection system 250 is increased in such a way to deliver a constant mass flow of compressed air from a combination of the storage tank 282 and the air injection system 250 to the gas turbine engine 200. As a result of this process, the gas turbine engine 200 can deliver the desired amount and constant incremental power in seconds by utilizing the stored air and then continuously provide incremental power from the air injection system 250.

In order to provide the required air flow to the gas turbine engine 200, in one embodiment, a rate of the hot compressed air initially flowing from the storage tank 282 is at approximately the same as a rate of the compressed air being delivered from the auxiliary air compressor 280.

Figure 3:
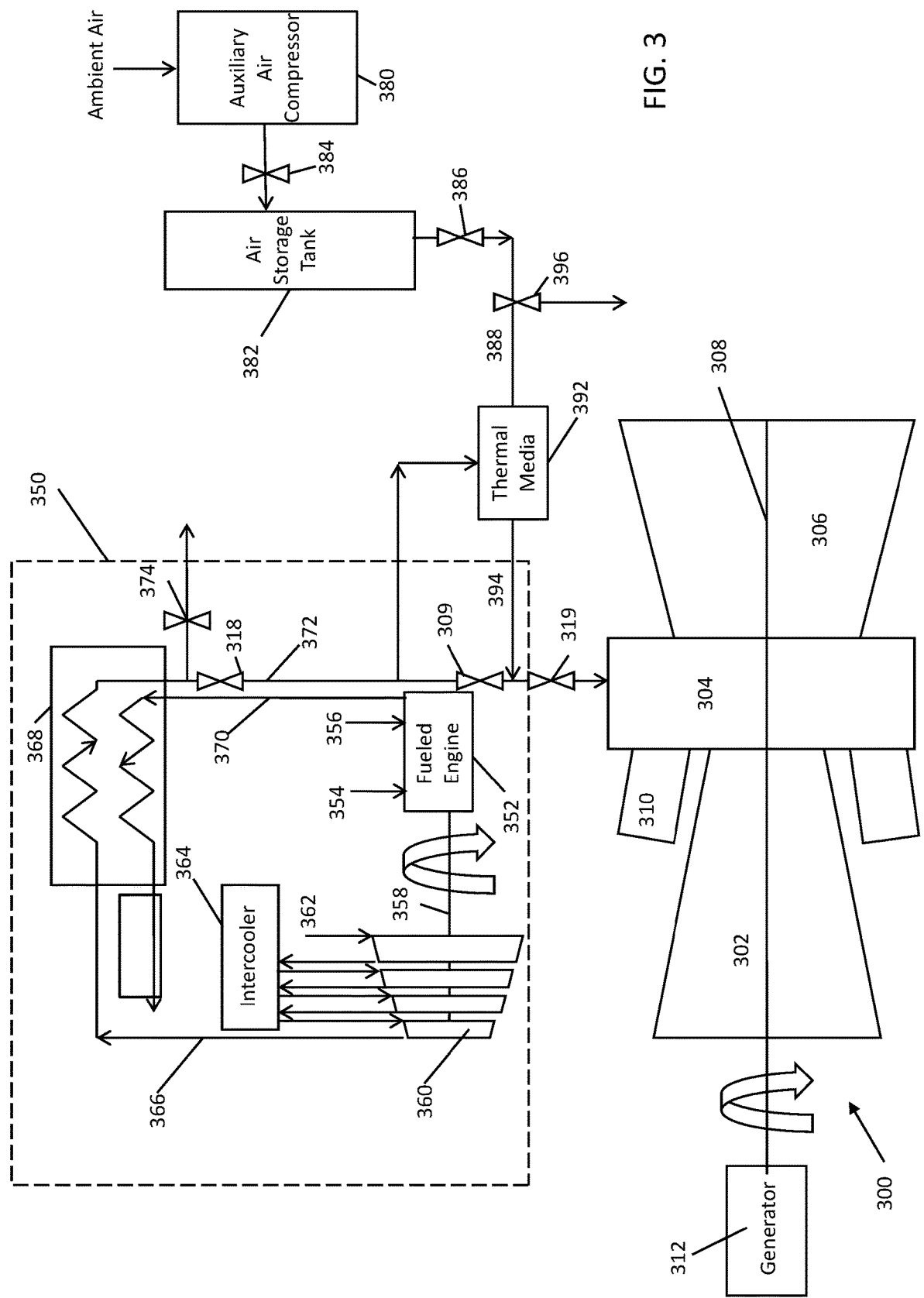
FIG. 3 is a schematic drawing of a gas turbine engine, air injection system, and air storage system in accordance with an alternate embodiment of the present invention.

Referring now to FIG. 3, an alternate embodiment of the present invention is depicted. In this embodiment, a similar process utilizing stored compressed air can be used to smoothly ramp down the power augmentation of the air injection system 350 in the event the air injection system 350 becomes unavailable or goes off line. The features of the gas turbine engine 300 and air injection system 350 are similar to those defined above with respect to FIGS. 1 and 2, and therefore will not be described again. For example, heated compressed air 372 may be substantially the same or similar to the heated compressed air 172 and 272, vent valve 374 may be substantially the same or similar to the vent valves 174 and 274, et cetera. A method of providing continuous supplemental heated compressed air to a gas turbine engine is provided where a gas turbine engine 300 is operated such that hot compressed air is supplied to the gas turbine engine 300 from an air injection system 350 that is separate from the gas turbine engine 300. The gas turbine engine 300 has a compressor 302, a compressor discharge plenum 304, one or more combustors 310, and a turbine 306 fluidly connected to each other. Air is compressed with an auxiliary air compressor 380 to a pressure higher than air in the compressor discharge plenum 304. The air from the auxiliary air compressor 380 is then stored in a storage tank 382. Once the storage tank 382 has the desired amount of compressed air, the flow of hot compressed air from the air injection system 350 is reduced and the flow of compressed air from the storage tank 382 is initiated. The air from the storage tank 382 is heated with a thermal media 392 to form a mass of hot compressed air. The thermal media 392 can take on a variety of forms including air flowing through hot rocks or a porous media. The flow rate of air from the air injection system 350 is further reduced and eventually terminated. The flow of hot compressed air continues from the pipe 394 (from thermal media source 392) until the airflow is terminated. In an embodiment of the present invention, reducing the flow of compressed air from the storage tank 382 occurs in such a way to maintain a net overall reduction in flow rate of air to the gas turbine engine 300.

The thermal media 392 can be heated by a variety of sources. For example, the thermal media 392 can be heated by an external source, an internal source, with air from the air injection system 350, or with air from the gas turbine engine 300, as shown in FIG. 3.

In this process, a thermal media storage tank 392 is added to the air storage injection line 388. The air storage tank 382 is still utilized, however, no heating source is required, thus the air is stored in the storage tank 382 at ambient temperature. In addition, a bypass valve 309 is added to create a restriction in the air injection line located between valves 318 and 319. This bypass valve 309 creates a pressure drop between the air upstream of the bypass valve 309 and the downstream side of the bypass valve 309, which causes a portion of the air passing through valve 318 to be directed through the thermal media storage tank 382, causing the media to increase in temperature and stay heated when the air injection system 350 is in operation. During this thermal media heating process, the air storage outlet valve 386 is closed. As one skilled in the art can appreciate, more air can be forced through the thermal media storage tank 392 to initially heat the media and then the flow can be reduced after the media is at a desired temperature to maintain the desired temperature. Alternately, an optional vent 396 can be used that could allow gas turbine compressed air to flow from the gas turbine engine 300, through the thermal media 392 to heat the media if it is desired to heat the media when the air injection system 350 is not operating. In this case, valve 309 and 386 would be closed and valve 319 and 396 would be at least partially opened allowing pressurized air to be released from the gas turbine engine 300 through the thermal media. The bypass valve 309 can be controlled on a thermostat which is measuring directly or indirectly the temperature of the thermal media 392. If for some unexpected reason the air injection system 350 stops delivering hot air to the gas turbine engine 300, valves 318 and 309 close while valve 386 opens. Valve 386 can be variably controlled to initially deliver the same air mass flow as the air injection system 350 was delivering before an interruption in service. As the air in the tank 382 is depleted, the flow of air is smoothly ramp down over a specified period of time.

The invention claimed is:

1. A method of reducing start time of a gas turbine engine, the method comprising:
operating the gas turbine engine having a compressor, a compressor discharge plenum, a combustor, and a turbine;
compressing air with a first auxiliary air compressor to a pressure higher than that of the compressor discharge plenum;
storing the compressed air of the first auxiliary air compressor in a storage tank;
heating the stored compressed air in the storage tank to form hot compressed air in the storage tank, wherein the storage tank is heated with air from the compressor discharge plenum, and the pressure of the stored compressed air is at least five times higher than that of the air in the compressor discharge plenum; and
injecting a first flow of the hot compressed air from the storage tank at a flow rate into the gas turbine engine sufficient to increase the power output of a gas turbine power plant, for a period of time;
operating an auxiliary air injection system during the period of time by generating a second flow of hot compressed air with a second auxiliary air compressor of the auxiliary air injection system;
routing the second flow of hot compressed air only to atmosphere during the period of time; and,
reducing the first flow of the hot compressed air from the storage tank to the gas turbine engine while simultaneously increasing the second flow of the hot compressed air from the auxiliary air injection system to the gas turbine engine and decreasing the routing of the second flow of the hot compressed air to the atmosphere, after the period of time has expired.

2. The method according to claim 1, wherein the first flow of the hot compressed air from the storage tank is reduced and the second flow of the hot compressed air from the auxiliary air injection system is increased in such a way to deliver a constant mass flow of the hot compressed air from a combination of the storage tank and the auxiliary air injection system to the gas turbine engine.

3. The method according to claim 1, wherein a rate of the first flow of the hot compressed air initially flowing from the storage tank is at approximately a rate of the second flow of the hot compressed air being delivered from the auxiliary air compressor.

4. The method according to claim 1, wherein a pressure of the hot compressed air in the storage tank is more than five times greater than a pressure of the air in the compressor discharge plenum.

5. A supplemental air supply system for a gas turbine engine comprising:
a compressor, a compressor discharge plenum, a combustor, and a turbine fluidly connected to each other;
an air injection system in selective communication with the compressor discharge plenum via a first valve and a second valve downstream the first valve, and in selective communication with atmosphere via a third valve, the air injection system comprising a first auxiliary air compressor; and
a second auxiliary air compressor in fluid communication with a storage tank, where the storage tank is in selective communication with the gas turbine engine via a fourth valve upstream of the second valve;
wherein in a start up mode:
the storage tank is heated with air from the compressor discharge plenum to form heated compressed air within the storage tank, and a stored compressed air pressure in the storage tank is at least five times higher than that of the air in the compressor discharge plenum;
the air injection system routes a first flow of compressed air from the first auxiliary air compressor to the atmosphere while the first valve is closed and the third valve is open, and the storage tank provides a second flow of the heated compressed air to the compressor discharge plenum of the gas turbine engine while the second valve and the fourth valve are open, for a period of time;

the first valve and the fourth valve separate the first flow of compressed air from the second flow of the heated compressed air when either the first valve or the fourth valve is closed; and after the period of time, the first valve opens and the fourth valve closes, reducing the second flow of the heated compressed air while simultaneously, increasing the first flow of compressed air to the gas turbine engine and decreasing the first flow of compressed air to the atmosphere, until the third valve and the fourth valve are completely closed as desired.

6. The supplemental air supply system of claim 5, wherein the fourth valve comprises one or more valves further regulating flow of the second flow of the heated compressed air from the storage tank.

7. The supplemental air supply system of claim 5, wherein the second flow of the heated compressed air from the storage tank is heated with heat from the air injection system.

8. The supplemental air supply system of claim 5, wherein the auxiliary air compressor is electrically driven.

9. The supplemental air supply system of claim 5, wherein the storage tank is directly heated with waste heat from a fueled engine of the air injection system.

10. The supplemental air supply system of claim 5, wherein the storage tank is heated by a steam-to-air heat exchanger located within the storage tank.

* * * * *